(12) United States Patent
Lacy (10) Patent No.: US 9,218,946 B2
(45) Date of Patent: Dec. 22, 2015

(54) SEALED BORON COATED STRAW DETECTORS

(75) Inventor: Jeffrey Lacy, Houston, TX (US)

(73) Assignee: Proportional Technologies, Inc., Houston, TX (US)

( * ) Notice: Subject to any disclaimer, the term of this patent is extended or adjusted under 35 U.S.C. 154(b) by 275 days.

(21) Appl. No.: 13/106,785

(22) Filed: May 12, 2011

(65) Prior Publication Data

US 2012/0153180 A1  Jun. 21, 2012

Related U.S. Application Data

(60) Provisional application No. 61/334,362, filed on May 13, 2010.

(51) Int. Cl.
*G01T 3/00* (2006.01)
*H01J 47/12* (2006.01)
*G01T 3/06* (2006.01)

(52) U.S. Cl.
CPC .............. *H01J 47/1205* (2013.01); *G01T 3/008* (2013.01); *G01T 3/00* (2013.01); *G01T 3/06* (2013.01)

(58) Field of Classification Search
CPC .................................... G01T 3/00; G01T 3/06
USPC .................................................... 250/390.12
See application file for complete search history.

(56) References Cited

U.S. PATENT DOCUMENTS

| | | | | |
|---|---|---|---|---|
| 2,443,731 A * | 6/1948 | Herzog et al. | ................. | 250/265 |
| 2,541,341 A * | 2/1951 | Crumrine | ..................... | 250/261 |
| 3,383,538 A * | 5/1968 | Bowyer | ........................... | 313/93 |
| 3,483,377 A | 12/1969 | Borkowski et al. | | |
| 3,860,845 A * | 1/1975 | Gleason et al. | ............... | 376/155 |
| 4,359,372 A | 11/1982 | Nagai et al. | | |
| 4,404,164 A | 9/1983 | Kopp et al. | | |
| 4,695,476 A | 9/1987 | Feild, Jr. | | |
| 5,151,601 A | 9/1992 | Regimand | | |
| 5,434,415 A | 7/1995 | Terada et al. | | |
| 5,573,747 A | 11/1996 | Lacy | | |
| 6,011,265 A * | 1/2000 | Sauli | ............................. | 250/374 |
| 6,078,039 A | 6/2000 | Lacy | | |
| 6,264,597 B1 | 7/2001 | Lacy | | |
| 6,426,504 B1 * | 7/2002 | Menlove et al. | .......... | 250/390.01 |
| 6,483,114 B1 | 11/2002 | Lacy | | |
| 6,486,468 B1 | 11/2002 | Lacy | | |

(Continued)

FOREIGN PATENT DOCUMENTS

EP         0204565 A      12/1986

OTHER PUBLICATIONS

Pascual, E., et al. "Boron Carbide Thin Films Deposited by Tuned-Substrate RF Magnetron Sputtering," Diamond and Related Materials, Mar. 1999, pp. 402-405, vol. 8, Amsterdam.

(Continued)

*Primary Examiner* — Christine Sung
(74) *Attorney, Agent, or Firm* — Hasley Scarano, L.L.P.

(57) ABSTRACT

The present invention is a method and apparatus for operating boron-coated straw detectors in sealed mode, without the need for a continuous flow of gas. Sealed-mode operation is necessary when using the boron-coated straw detectors in the field, where access to a continuous flow of the required gas mixture is not practical. Also, sealed-mode operation is necessary when the straw detectors are used as portable instruments, that must be moved from one location to the next swiftly, or that must be operated while in motion.

26 Claims, 7 Drawing Sheets

(56) References Cited

U.S. PATENT DOCUMENTS

| | | | |
|---|---|---|---|
| 7,002,159 | B2 | 2/2006 | Lacy |
| 7,078,704 | B2 | 7/2006 | Lacy et al. |
| 2005/0205798 | A1* | 9/2005 | Downing et al. ........ 250/390.11 |
| 2007/0018110 | A1 | 1/2007 | McGregor et al. |
| 2009/0014636 | A1* | 1/2009 | Luling et al. ................. 250/256 |
| 2009/0074128 | A1 | 3/2009 | Bertozzi |
| 2010/0163744 | A1 | 7/2010 | Lacy |
| 2010/0258734 | A1* | 10/2010 | McCormick et al. .... 250/390.01 |
| 2010/0301226 | A1 | 12/2010 | Lacy |
| 2011/0272570 | A1* | 11/2011 | Xu et al. ..................... 250/269.4 |
| 2012/0217406 | A1* | 8/2012 | McGregor et al. ........ 250/361 R |

OTHER PUBLICATIONS

Sharma A. "Properties of Some Gas Mixtures Used in Tracking Detectors." SLAC Journal ICFA 16-3, Jul. 2, 1998.

Sun, L., et al. "A Positron Emission Mammography System Based on 4 mm Straw Detectors," IEEE 2007 Nuclear Science Symposium Conf. Record, Oct. 26-Nov. 3, pp. 3337-3344, vol. 5.

Shehad, N.M., et al. "Small Animal PET Camera Design Based on 2 mm Straw Detectors," IEEE 2006 Nuclear Science Symposium Conference Record, Oct. 29-Nov. 1, pp. 2462-2468, vol. 4.

Shehad, N.M., et al. "Novel Lead-Walled Straw PET Detector for Specialized Imaging Applications," IEEE 2005 Nuclear Science Symposium Conference Record, Oct. 23-29, pp. 2895-2898, vol. 5.

Shehad, N.M., et al. "Ultra-High Resolution PET Detector Using Lead Walled Straws," IEEE 2002 Nuclear Science Symposium Conference Record, Nov. 10-16, pp. 1839-1843, vol. 3.

Lacy, J.L., et al. "Long Range Neutron-Gamma Point Source Detection and Imaging Using Unique Rotating Detector," IEEE 2007 Nuclear Science Symposium Conference Record, pp. 185-191, vol. 1.

Athanasiades, A., et al. "High Sensitivity Portable Neutron Detector for Fissile Materials," IEEE 2005 Nuclear Science Symposium Conference Record, Oct. 23-29, pp. 1009-1013, vol. 2.

Lacy, J.L., et al. "Performance of 1 Meter Straw Detector for High Rate Neutron Imaging," IEEE 2006 Nuclear Science Symposium Conference Record, Oct. 29-Nov. 1, pp. 20-26, vol. 1.

Athanasiades, A., et al. "Straw Detector for High Rate, High Resolution Neutron Imaging," IEEE 2005 Nuclear Science Symposium Conference Record, Oct. 23-29, pp. 623-627, vol. 2.

Lacy, J.L., et al. "Novel Neutron Detector for High Rate Imaging Applications," IEEE 2002 Nuclear Science Symposium Conference Record, Nov. 101-6, pp. 392-396, vol. 1.

\* cited by examiner

Design Examples of Boron-Coated Straw Detectors
Grouped Together to Form Bundles

SEALED BORON COATED STRAW DETECTORS

CROSS-REFERENCE TO RELATED APPLICATIONS

Claims priority to provisional application 61/334,362 filed May 13, 2010.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

This invention relates to radiation detection. More particularly, the invention relates to a method and apparatus for passive detection of neutron emitting materials with applications in homeland security and nuclear safeguards.

2. Description of the Related Art

US government plans to equip major seaports with large area neutron detectors, in an effort to intercept the smuggling of nuclear materials, have precipitated a critical shortage of $^3$He gas. It is estimated that the annual demand of $^3$He for US security applications alone is 22 kiloliters, more than the worldwide supply. This is strongly limiting the prospects of neutron science, safeguards, and other applications that rely heavily on $^3$He-based detectors. Clearly, alternate neutron detection technologies that can support large sensitive areas, and have low gamma sensitivity and low cost must be developed.

The applicant has previously developed and patented a technology based on close-packed arrays of long aluminum or copper tubes (straws), 4 mm in diameter, coated on the inside with a thin layer of $^{10}$B-enriched boron carbide ($^{10}B_4C$). In addition to the high abundance of boron on Earth and low cost of $^{10}$B enrichment, the boron-coated straw (BCS) detector offers distinct advantages over conventional $^3$He-based detectors, including faster signals, short recovery time (ion drift), low weight, safety for portable use (no pressurization), and low production cost.

The background to the present invention and related art is best understood by reference to Applicant's own prior work, including in particularly, U.S. Pat. No. 7,002,159 B2 (the '159) entitled "Boron Coated Straw Neutron Detector" which issued Feb. 21, 2006. The '159 is hereby incorporated by reference in its entirety, for all purposes, including, but not limited to, supplying background and enabling those skilled in the art to understand, make and use in Applicant's present invention.

The background to the present invention and related art is best understood by reference to Applicant's own work. Applicant's issued patents and pending applications that may be relevant, including; (1) U.S. Pat. No. 5,573,747 entitled, "Method for Preparing a Physiological Isotonic Pet Radiopharmaceutical of $^{62}$CU; (2) U.S. Pat. No. 6,078,039 entitled, "Segmental Tube Array High Pressure Gas Proportional Detector for Nuclear Medicine Imaging"; (3) U.S. Pat. No. 6,264,597 entitled, "Intravascular Radiotherapy Employing a Safe Liquid Suspended Short-Lived Source"; (4) U.S. Pat. No. 6,483,114 D1 entitled, "Positron Camera"; (5) U.S. Pat. No. 6,486,468 entitled, "High Resolution, High Pressure Xenon Gamma Rays Spectroscopy Using Primary and Stimulated Light Emissions"; (6) U.S. Pat. No. 7,002,159 B2 (the '159) entitled "Boron Coated Straw Neutron Detector"; (7) U.S. Pat. No. 7,078,704 entitled, "Cylindrical Ionization Detector with a Resistive Cathode and External Readout"; (8) U.S. patent application Ser. No. 10/571,202, entitled, "Miniaturized $^{62}$Zn/$^{62}$CU Generator for High Concentration and Clinical Deliveries of $^{62}$CU Kit Formulation for the Facile Preparation of Radiolabeled Cu-bis(thiosemicarbazone) Compound"; (9) U.S. patent application Ser. No. 12/483,771 entitled "Long Range Neutron-Gamma Point Source Detection and Imaging Using Rotating Detector"; (10) U.S. Patent Application No. 61/183,106 entitled "Optimized Detection of Fission Neutrons Using Boron Coated Straw Detectors Distributed in Moderator Material"; (11) U.S. Patent Application No. 61/333,990 entitled "Neutron Detectors for Active Interrogation"; and (12) U.S. Patent Application No. 61/334,015 entitled "Nanogenerator." Each of these listed patents are hereby incorporated by reference in their entirety for all purposes, including, but not limited to, supplying background and enabling those skilled in the art to understand, make and use in Applicant's present invention.

BRIEF SUMMARY OF THE INVENTION

The present invention is a method and apparatus for operating boron-coated straw detectors in sealed mode, without the need for a continuous flow of gas. Boron-coated straw detectors are described in Applicant's prior U.S. Pat. No. 7,002,159 B2 entitled "Boron Coated Straw Neutron Detector" which issued Feb. 21, 2006. The present invention includes an apparatus for detecting radiation comprising at least one boron-coated straw, a thin wall tube having a diameter sized no larger than necessary to accommodate said boron-coated straw(s); and a gas mixture sealed within said thin wall tube. Another embodiment of the present invention includes an apparatus for detecting radiation comprising multiple boron-coated straws, a thin wall tube having a diameter sized no larger than necessary to accommodate said multiple boron-coated straws; and a gas mixture sealed within said thin wall tube wherein said straws are arranged in close-packed, hexagonal configurations with the following number of tubes $$N = 1 + \sum_{k=0}^{B-1} 6k$$

wherein N=the number of boron coated straws in a detector; B=the number of layers of straws in a detector, i.e. single straw is one layer, and k=positive integers.

The gas contained within the straw detectors is a specified gas mixture, of high purity and specified pressure, and it is critical to the successful operation of the straw detectors. Straw detectors can operate either with a continuous flow of the specified gas mixture, or in sealed mode as presented here. When operated in sealed mode, proper sealing of the straw detectors is crucial for stable operation. Embodiments of the present invention include those where the gas mixture is composed of any noble gas combined with a quench gas, including $CO_2$, $CH_4$, $CF_4$, $C_2H_6$, $N_2$, $H_2$, $H_2O$, for absorbing photon emissions and increasing the drift velocity of electrons. Additional embodiments of the present invention include gas mixtures comprising: (1) Ar/$CO_2$ with $CO_2$ content in the range 1% to 20%; (2) Ar/$CH_4$ with $CH_4$ content in the range 1% to 20%; (3) Xe/$CO_2$ with $CO_2$ content in the range 1% to 20%; (4) Xe/CH4 with CH4 content in the range 1% to 20%; (5) He/CH4 with CH4 content in the range 1% to 20%; and (6) He/CO2 with CO2 content in the range 1% to 20%. An embodiment of the present invention includes having the gas mixture is maintained at an absolute pressure less than 2 atm.

Sealed-mode operation is necessary when using the boron-coated straw detectors in the field, where access to a continuous flow of the required gas mixture is not practical.

Also, sealed-mode operation is necessary when the straw detectors are used as portable instruments that must be moved from one location to the next swiftly or that must be operated while in motion.

DETAILED DESCRIPTION OF THE INVENTION

Figure 1:
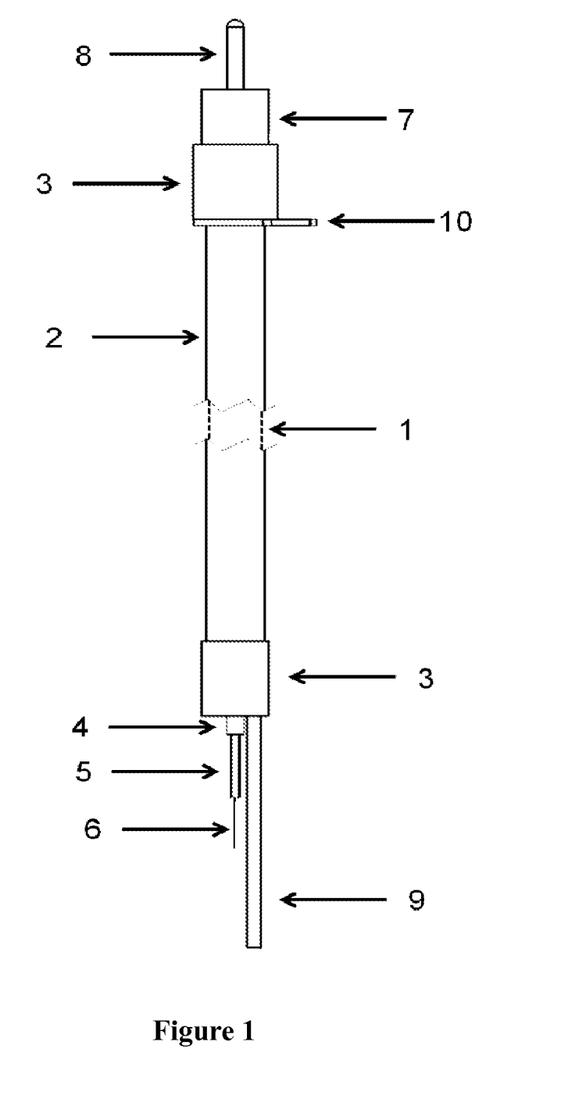
FIG. 1 is a drawing of the present invention.

Referring to FIG. 1, the apparatus comprises combining a thin walled aluminum or stainless steel (or similar material) tube 2, and a fitting 3, at either end of the tube. Fitting 3 can be composed of aluminum or other material that is easy to machine and bonds well with the other materials attached to it. The boron coated straw 1 fits entirely within the tube and is secured in place with the two end fittings. Embodiments include end fitting configured to receive and position the boron-coated straw(s) centrally within the thin wall tube and to receive and position an anode wire. The end fittings incorporate a central hole through which a ceramic feed-through tube 4 is positioned. A crimping tube 5 is positioned inside the ceramic (or other electrical insulator) tube 4. Embodiments of crimping tube 5 are composed of copper. Crimping tubes can have an inner diameter large enough to accommodate a thin metallic wire up to 50 µm in diameter and are capable of crimping around the wire to securely retain high tension in the wire. A thin metallic wire 6 passes through the tube 5. The wire 6 is tensioned, then crimped in place. A gold-plated pin 8 connects to the crimp tube 5. The wire forms the anode electrode that connects, through the crimp tube 5 and pin 8, to a high voltage supply, and to a preamplifier through a coupling capacitor. A plastic collar 7 is used to provide additional electrical insulation between the anode and fitting 3. For embodiment including multiple boron coated straws in a single bundle, end fittings are provided with accurately positioned insulating feed-throughs capable of receiving and positioning all associated wires. Embodiments may include fitting having multiple holes through which feed-through insulating tubes are fitted. Tube 9 serves as a gas port, used to purge the volume inside tube 2, and to fill the volume inside tube 2 with a specified gas mixture. A grounding collar 10 connects the tube 2 (cathode) to an electrical ground. The ceramic tube 4, the crimping tube 5, the plastic collar 7, the gas port tube 9 and the end fittings 3 are fixed with epoxy.

Several boron-coated straw detectors were sealed using the present invention. Initially, the gas port 9 of the sealed detector was connected to a supply of a gas mixture of argon/CO2. The detector was then purged with a continuous flow of this gas mixture, while heated to 60° C. for a period of 18-24 hours. Using valves, the gas flow was stopped, then the detector was allowed to cool to room temperature. The detector was then connected to a vacuum pump, and evacuated to a pressure of 0.7 atm. The gas port 9 was then crimp sealed. In an embodiment of the present invention the gas port 9 fits inside the off-center hole of the fitting 3 and can be connected to an external vacuum and gas filling system. Embodiments of the present invention include those wherein the gas port 9 is composed of a ductile metal such as copper, stainless steel, nickel, or aluminum and capable of being sealed using pinch off technique.

In order to gage the seal quality and the resulting gas purity, the amplitude of signals corresponding to a single radiation energy were tracked in the sealed detectors over a period of time. Gas purity is essential to maintaining stable operation and an adequate signal-to-noise ratio. Gas contamination over long periods of time (due to materials outgassing, for instance) may alter the amplitude of signals, which in turn will affect the performance of the detector.

A pulse height spectrum was collected using a $^{241}$Am gamma ray source. Photons emitted by this isotope, primarily with an energy of 60 keV, interact with the copper walls of the straw detector. At this energy, most interactions in copper are of the photoelectric kind, resulting in the absorption of the incident photon, and prompt emission of a characteristic 8 keV X-ray photon. This 8 keV X-ray photon may subsequently escape into the gas volume, and interact with argon atoms, depositing all of its energy. As a result, an 8 keV energy peak appears in the pulse-height spectrum.

Figure 2:
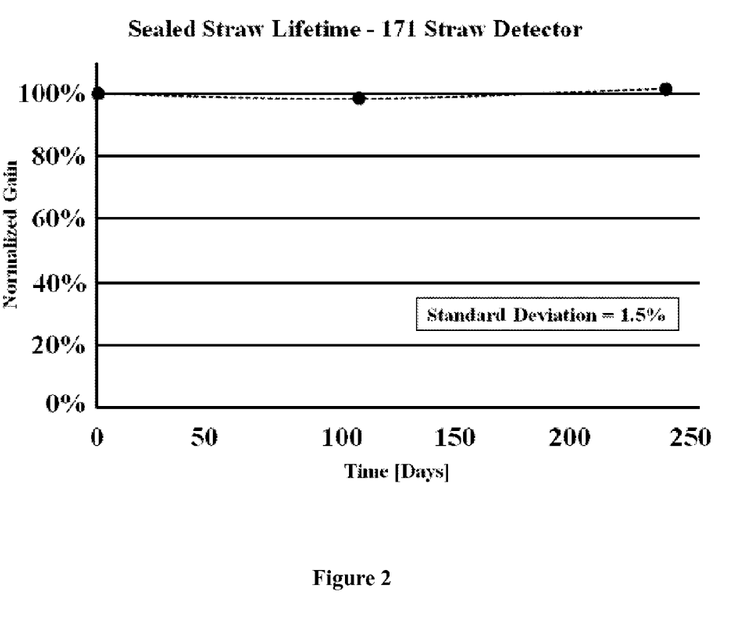
FIG. 2 shows the variation of gas gain over time, measured in prototype detectors that were sealed according to the present invention.

The location of the characteristic X-ray peak in the gamma energy spectrum was used to track gas purity as shown in FIG. 2.

Figure 3:
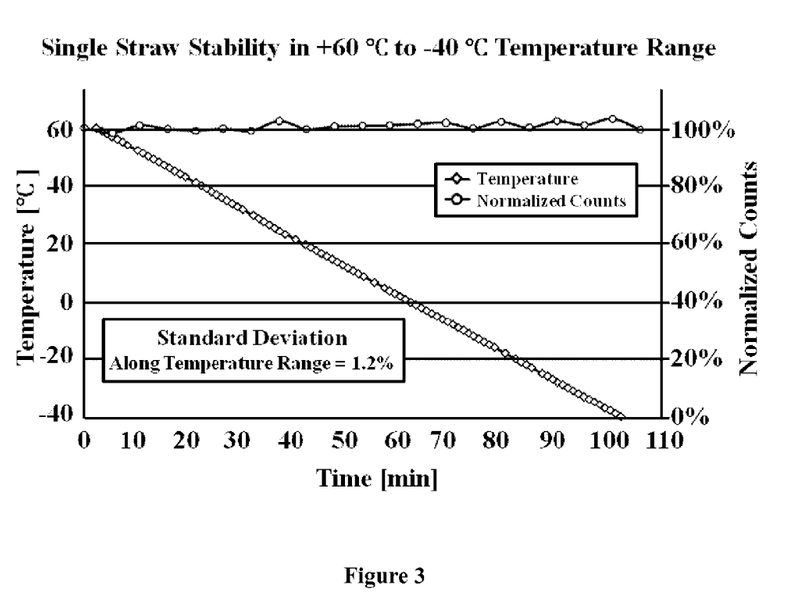
FIG. 3 shows the variation of gas gain over temperature, measured in prototype detectors that were sealed according to the present invention.
Figures 4A, 4B:
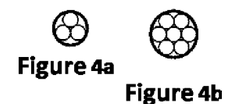
FIG. 4a through FIG. 4h shows design examples of boron-coated straw detectors grouped together to form bundles that are sealed inside a single external tube.
Figure 4C:
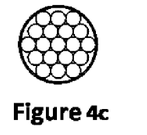
Figure 4D:
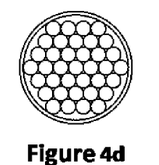
Figure 4E:
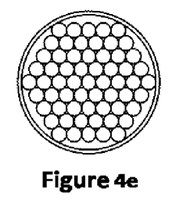
Figure 4F:
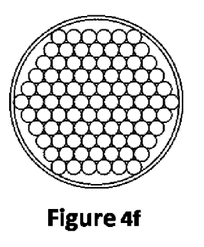
Figure 4G:
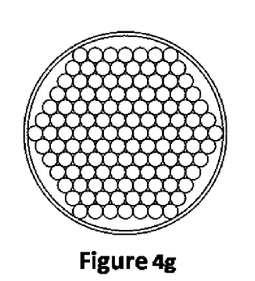
Figure 4H:
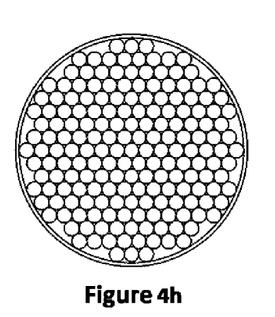

Temperature cycling tests were also carried out to evaluate the ability of the sealed straw detector to maintain stable operation at extreme environments. FIG. 3 shows the measured variation in the neutron counts recorded in a sealed straw detector during operation inside a chamber, where the temperature was varied from +60 C to −40 C.

EXAMPLES

The proposed invention is illustrated in FIGS. 4a to 4h. Each figure shows a standalone detector. The detector is a close-packed bundle of straws, where each straw detector is 4 mm in diameter and of length equal to the bundle length. Embodiments of the present invention include those wherein the thin wall tube and the straw(s) are approximately equal in length. The length may vary from a few centimeters to several meters. In the embodiments of FIGS. 4a to 4h the straws arearranged in close-packed, hexagonal configurations with the following number of tubes $$N = 1 + \sum_{k=0}^{B-1} 6k$$

wherein N=the number of boron coated straws in a detector; B=the number of layers of straws in a detector, i.e. single straw is one layer, and k=positive integers. The bundle is housed inside a sealed aluminum or stainless steel tube fitted with a fitting of appropriate design. Embodiments of the invention include those where the thin wall tube is composed of other materials which minimizes scattering of low energy neutrons and/or low Z material to minimize the sensitivity for gamma ray interactions Depending on the number of straws bundled, the dimensions and neutron sensitivity of the tube will vary, as shown in Table 1.

The anode electrodes of all BCS detectors within the bundle are connected together and read out with a single amplifier, using common electronics typically used to read out $^3$He tubes. Although the overall capacitance presented to the amplifier will be higher than that presented by a single tube of large diameter, the signals generated in the straw detectors are several times larger than those generated in $^3$He tubes, and thus, the signal-to-noise ratio is not affected by the larger capacitance.

Figure 5:
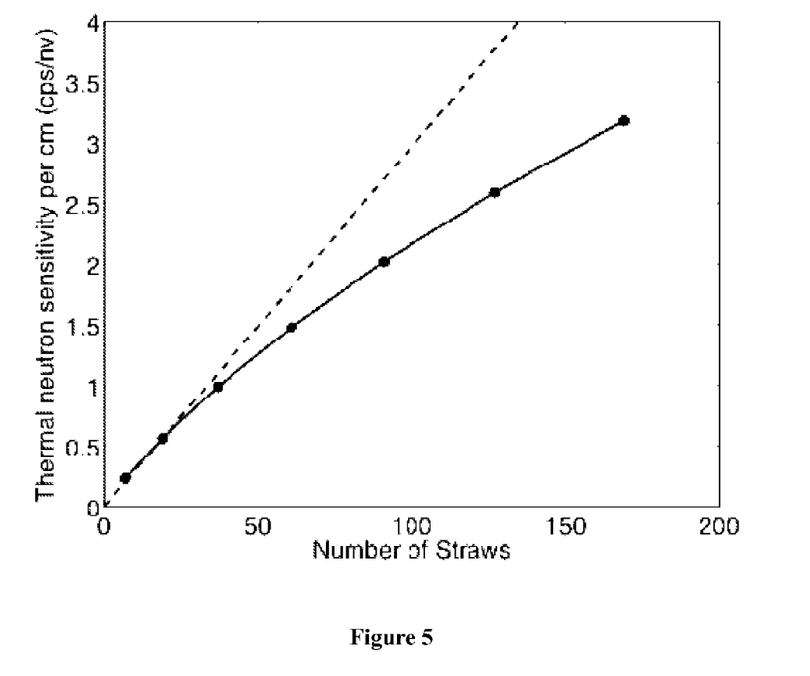
FIG. 5 is the predicted thermal neutron sensitivity (per unit length) of boron-coated straw bundles as a function of the number of straws making the bundle.

The detection efficiencies of the straw bundles were estimated in Monte Carlo simulations implemented in MCNP5 and are listed in Table 1. A parallel beam of monoenergetic neutrons was directed normally over the entire side of the bundle. The computed sensitivity (per unit length) is also plotted in FIG. 5 as a function of the number of straws. In all cases, a $^{10}$B$_4$C coating thickness of 1 μm was assumed.

The thermal neutron sensitivity of a $^3$He tube, with a 5.08 cm diameter (2 inches), pressurized to 2.5 atm, is ~3.4 cps/nv/cm, equivalent to that obtained with the 187-straw bundle, whose diameter is only slightly larger at 6.36 cm. The sensitivity of the BCS bundle can be further improved by optimizing the thickness of the $^{10}$B$_4$C coating.

Figure 6:
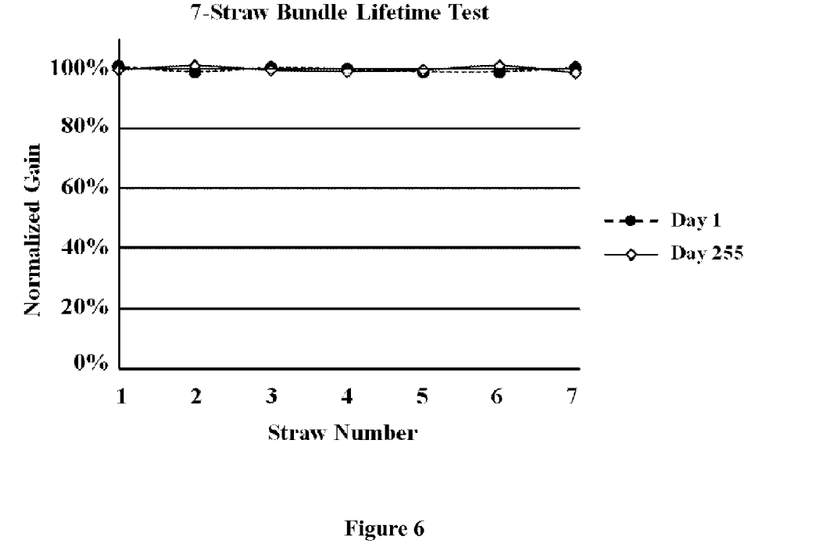
FIG. 6 shows the variation of gas gain over temperature, measured in a 7-straw bundle that was sealed according to the present invention.

The gain stability of the 7-straw bundle was also measured over the course of 255 days, as shown in FIG. 6. The gain variation was less than ±4%.

Figure 7:
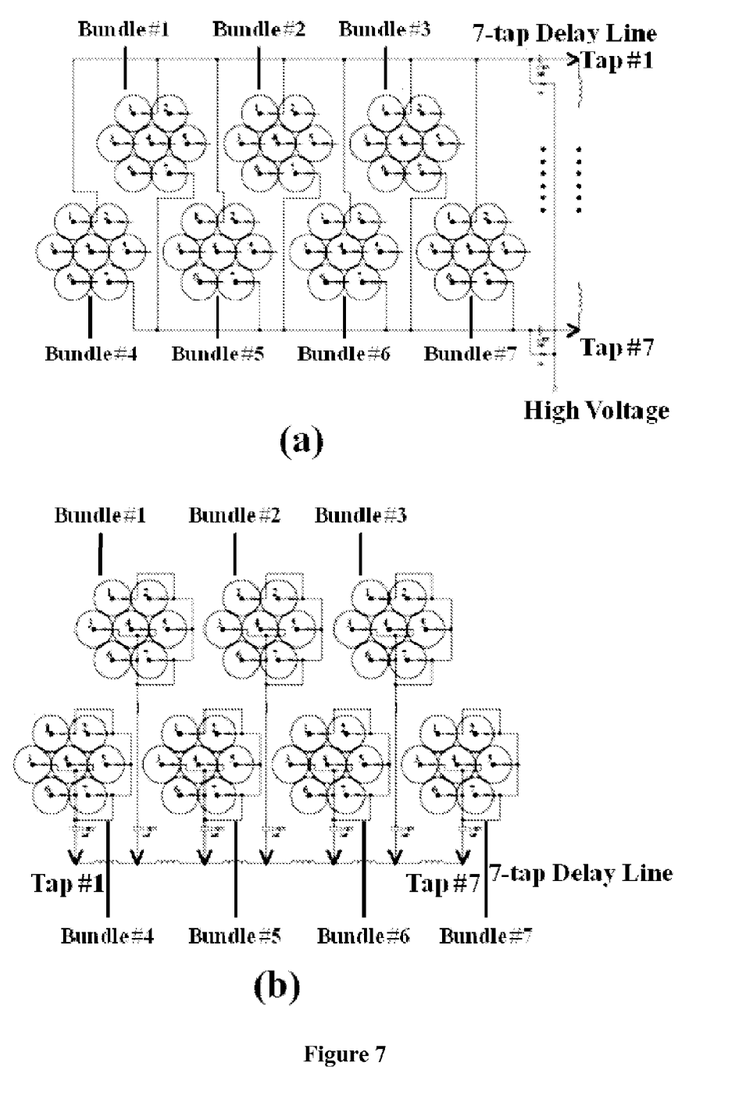
FIG. 7 illustrates the readout circuit for seven 7-straw bundles (49 straws).

Readout. When several straw detectors are grouped together in a bundle, reading them out separately would require a number of pre-amplifiers equal to the number of straws. Significant savings can be achieved with a readout scheme based on delay lines, offering the capability to decode the identity of the firing straw with only 2 pre-amplifiers. FIG. 7 illustrates the readout circuit for seven 7-straw bundles (49 straws). On one end of the bundles, all straws with the same index across different bundles are connected together, then to a different tap on delay line 1. On the other end of the bundles, all straws within the same bundle, are connected together, then to a tap on delay line 2. In this scheme, delay line 1 identifies the straw index within a single bundle, and delay line 2 identifies the specific bundle among the 7 bundles.

TABLE 1

Boron-coated straw bundle dimensions and thermal neutron sensitivity.

| Number of straws in bundle | Bundle Diameter (cm) | Detection efficiency for thermal neutrons (%) | Thermal neutron sensitivity per unit length [(cps/nv)/cm] |
|---|---|---|---|
| 1 (FIG. 4a) | 0.4 | 9.0 | 0.036 |
| 7 (FIG. 4b) | 1.27 | 18.4 | 0.234 |
| 19 (FIG. 4c) | 2.12 | 26.6 | 0.564 |
| 37 (FIG. 4d) | 2.97 | 33.3 | 0.989 |
| 61 (FIG. 4e) | 3.82 | 38.8 | 1.48 |
| 91 (FIG. 4f) | 4.67 | 43.3 | 2.02 |
| 127 (FIG. 4g) | 5.52 | 47.0 | 2.59 |
| 187 (FIG. 4h) | 6.36 | 50.0 | 3.4 |

I claim:

1. An apparatus for detecting radiation comprising:
   three or more boron-coated straws in a close-packed configuration;
   a thin wall tube having a diameter sized no larger than necessary to accommodate said boron-coated straws; and
   a gas mixture sealed within said thin wall tube.

2. The apparatus of claim 1 wherein the thin wall tube is composed of aluminum or other material which minimizes scattering of low energy neutrons.

3. The apparatus of claim 1 wherein the thin wall tube is composed of low Z material to minimize the sensitivity for gamma ray interactions.

4. The apparatus of claim 1 wherein the length of the thin wall tube is approximately equal to the length of the boron-coated straw(s).

5. The apparatus of claim 1 wherein said close-packed boron-coated straws are arranged in a hexagonal configuration with the following number of straws $$N = 1 + \sum_{k=0}^{B-1} 6k$$

wherein N=the number of boron coated straws in a detector; B=the number of layers of straws in a detector, i.e. single straw is one layer, and k=positive integers.

6. The apparatus of claim 1 wherein the gas mixture comprises Ar/CO2 with CO2 content in the range 1% to 20%.

7. The apparatus of claim 1 wherein the gas mixture comprises Ar/CH4 with CH4 content in the range 1% to 20%.

8. The apparatus of claim 1 wherein the gas mixture comprises Xe/CO2 with CO2 content in the range 1% to 20%.

9. The apparatus of claim 1 wherein the gas mixture comprises Xe/CH4 with CH4 content in the range 1% to 20%.

10. The apparatus of claim 1 wherein the gas mixture has an absolute pressure less than 2 atm.

11. The apparatus of claim 1 further comprising end fittings having accurately positioned multiple insulating feedthroughs for receiving and positioning multiple anode wires.

12. The apparatus of claim 1 wherein the gas mixture is He/CH4 with CH4 content in the range 1% to 20%.

13. The apparatus of claim 1 wherein the gas mixture is He/CO2 with CO2 content in the range 1% to 20%.

14. The apparatus of claim 1 wherein the gas mixture is composed of any noble gas combined with a quench gas, including $CO_2$, $CH_4$, $CF_4$, $C_2H_6$, $N_2$, $H_2$, $H_2O$, whose purpose is to absorb photon emissions and to increase the drift velocity of electrons.

15. An apparatus for detecting radiation comprising:
   at least one boron-coated straw;
   a thin wall tube having a diameter sized no larger than necessary to accommodate said boron-coated straw(s);
   an end fitting for sealing an end of said thin wall tube; said end fitting being configured to receive and position the boron-coated straw(s) centrally within said thin wall tube and to receive and position an anode wire, and having a gas port for purging and filling with the gas mixture; and
   a gas mixture sealed within said thin wall tube.

16. The apparatus of claim 15 wherein said end fitting is configured to receive and position an anode wire through a feed-through insulating tube inserted in a hole positioned centrally to an outward surface of the end fitting.

17. The apparatus of claim 16 wherein said feed-through insulating tube comprises a ceramic insulator material.

18. The apparatus of claim 16 comprising multiple feed-through insulating tubes inserted in multiple holes positioned around an outward surface of the end fitting.

19. The apparatus of claim 15 comprising a plurality of boron-coated straws arranged in hexagonal configurations with the following number of straws $$N = 1 + \sum_{k=0}^{B-1} 6k$$

wherein N=the number of boron coated straws in a detector; B=the number of layers of straws in a detector, i.e. single straw is one layer, and k=positive integers.

20. An apparatus for detecting radiation comprising:
   multiple boron-coated straws;
   a thin wall tube having a diameter sized no larger than necessary to accommodate said multiple boron-coated straws; and
   a gas mixture sealed within said thin wall tube;
   wherein said straws are arranged in close-packed, hexagonal configurations with the following number of straws $$N = 1 + \sum_{k=0}^{B-1} 6k$$

wherein N=the number of boron coated straws in a detector; B=the number of layers of straws in a detector, i.e. single straw is one layer, and k=positive integers.

21. The apparatus of claim 20 comprising 187 boron-coated straws, wherein the diameter of the thin wall tube is sized to accommodate the 187 boron-coated straws arranged in close-packed, configuration.

22. The apparatus of claim 20 comprising 7 boron-coated straws, wherein the diameter of the thin wall tube is sized to accommodate the 7 boron-coated straws are arranged in a close-packed configuration.

23. The apparatus of claim 20 wherein the gas mixture has an absolute pressure less than 2 atm.

24. An apparatus for detecting radiation comprising multiple neutron detectors, each neutron detector comprising a bundle of multiple boron-coated straws; a thin wall tube having a diameter sized no larger than necessary to accommodate said bundle of multiple boron-coated straws; and a gas mixture sealed within said thin wall tube;
   wherein the boron-coated straws of each bundle are arranged in close-packed, hexagonal configurations with the number of straws in the bundle being one of the numbers determined by the following formula:

$$N = 1 + \sum_{k=0}^{B-1} 6k$$

wherein N=the number of boron coated straws in a detector; B=the number of layers of straws in a detector, i.e. single straw is one layer, and k=positive integers.

25. The apparatus of claim 24 comprising seven neutron detectors, each detector comprising seven boron-coated straws in a bundle.

26. An apparatus for detecting radiation comprising multiple neutron detectors, each neutron detector comprising a bundle of multiple boron-coated straws; a thin wall tube having a diameter sized no larger than necessary to accommodate said bundle of multiple boron-coated straws; and a gas mixture sealed within said thin wall tube; wherein said multiple boron-coated straws are arranged in close-packed, hexagonal configurations; and further comprising end fittings having accurately positioned multiple insulating feed-throughs for receiving and positioning multiple anode wires.

* * * * *